US012363667B2

(12) United States Patent
Smith et al.

(10) Patent No.: US 12,363,667 B2
(45) Date of Patent: Jul. 15, 2025

(54) TIME SYNCHRONIZATION DISTRIBUTION IN A NETWORK

(71) Applicant: Cisco Technology, Inc., San Jose, CA (US)

(72) Inventors: Malcolm Muir Smith, Richardson, TX (US); Jerome Henry, Pittsboro, NC (US); Sanjay Katabathuni, Fremont, CA (US)

(73) Assignee: Cisco Technology, Inc.

( * ) Notice: Subject to any disclaimer, the term of this patent is extended or adjusted under 35 U.S.C. 154(b) by 330 days.

(21) Appl. No.: 17/737,590

(22) Filed: May 5, 2022

(65) Prior Publication Data

US 2023/0362859 A1  Nov. 9, 2023

(51) Int. Cl.
*H04W 56/00* (2009.01)
*H04W 4/06* (2009.01)

(52) U.S. Cl.
CPC .......... *H04W 56/005* (2013.01); *H04W 4/06* (2013.01); *H04W 56/001* (2013.01)

(58) Field of Classification Search
CPC .... H04W 4/06; H04W 56/001; H04W 56/005
See application file for complete search history.

(56) References Cited

U.S. PATENT DOCUMENTS

| 6,590,891 B1* | 7/2003 | Jacquet | H04B 7/269 |
| | | | 370/350 |
| 2004/0125786 A1* | 7/2004 | Fuchs | H04W 48/12 |
| | | | 370/348 |
| 2016/0345277 A1* | 11/2016 | Segev | H04W 56/001 |
| 2018/0109970 A1 | 4/2018 | Chu et al. | |
| 2019/0190635 A1 | 6/2019 | Goel et al. | |
| 2020/0092850 A1* | 3/2020 | Jiang | H04W 72/04 |

FOREIGN PATENT DOCUMENTS

| WO | 2020081060 A1 | 4/2020 |
| WO | 2020111995 A1 | 6/2020 |

* cited by examiner

*Primary Examiner* — Stephen J Clawson
(74) *Attorney, Agent, or Firm* — Merchant & Gould P. C.

(57) ABSTRACT

Time synchronization distribution in a network may be provided. Time synchronization may be performed by an Access Point (AP) with a plurality of client devices. Next, based on information received from performing the time synchronization with the plurality of client devices, it may be determined that a first client device of the plurality of client devices is a representative client device. Then, for a predetermined time period, time synchronization with the first client device and not with others of the plurality of client devices may be performed. The data associated with the time synchronization with the first client device may be broadcast to others of the plurality of client devices.

20 Claims, 5 Drawing Sheets

TIME SYNCHRONIZATION DISTRIBUTION IN A NETWORK

TECHNICAL FIELD

The present disclosure relates generally to providing time synchronization.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Time synchronization distribution in a network may be provided. Time synchronization may be performed by an Access Point (AP) with a plurality of client devices. Next, based on information received from performing the time synchronization with the plurality of client devices, it may be determined that a first client device of the plurality of client devices is a representative client device. Then, for a predetermined time period, time synchronization with the first client device and not with others of the plurality of client devices may be performed. The data associated with the time synchronization with the first client device may be broadcast to others of the plurality of client devices.

Both the foregoing overview and the following example embodiments are examples and explanatory only and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Enterprise and industrial use cases may rely on accurate time synchronization for scheduled time-sensitive applications such as multi-user Virtual reality (VR)/Augmented reality (AR) and Internet-of-Things (IOT) to meet tight control loop and jitter requirements (e.g., <1 ms). This capability may be provided by the Institute of Electrical and Electronics Engineers (IEEE) 802.11 AS specification (generalized Precision Time Protocol (gPTP)) combined with either Time Measurement (TM) or Fine-Time-Measurement (FTM) for example.

With FTM defined for point-to-point synchronization (e.g., one Access Point (AP) and one client device), the AP may act as the gPTP master-clock. The client device (i.e., a station (STA)) may send a TM or FTM request and may use the TM or FTM exchange to measure its range to the AP. In the last frame, the AP may add a FollowUp Information Element (IE) with AP time information. The client device may use the range (thus delay) to the AP and the AP clock value to align its own clock accurately.

One problem may be a large number of client devices that may need the aforementioned time synchronization capability at short intervals (e.g., every 2 seconds) and the resulting TM or FTM transaction overhead. While the per client device overhead may be controlled via FTM/TM parameters, the number of client devices may remain a problem. For example, a room filled with students wearing ARNR headsets and participating in a multi-user time-sensitive experience or a factory with hundreds or thousands of tiny actuators on a huge machine controlled by a single Programmable Logic Controller (PLC) may create a transaction overhead issue. Embodiments of the disclosure may solve this transaction overhead issue, for example, by utilizing a group representative among the client devices.

Figure 1:
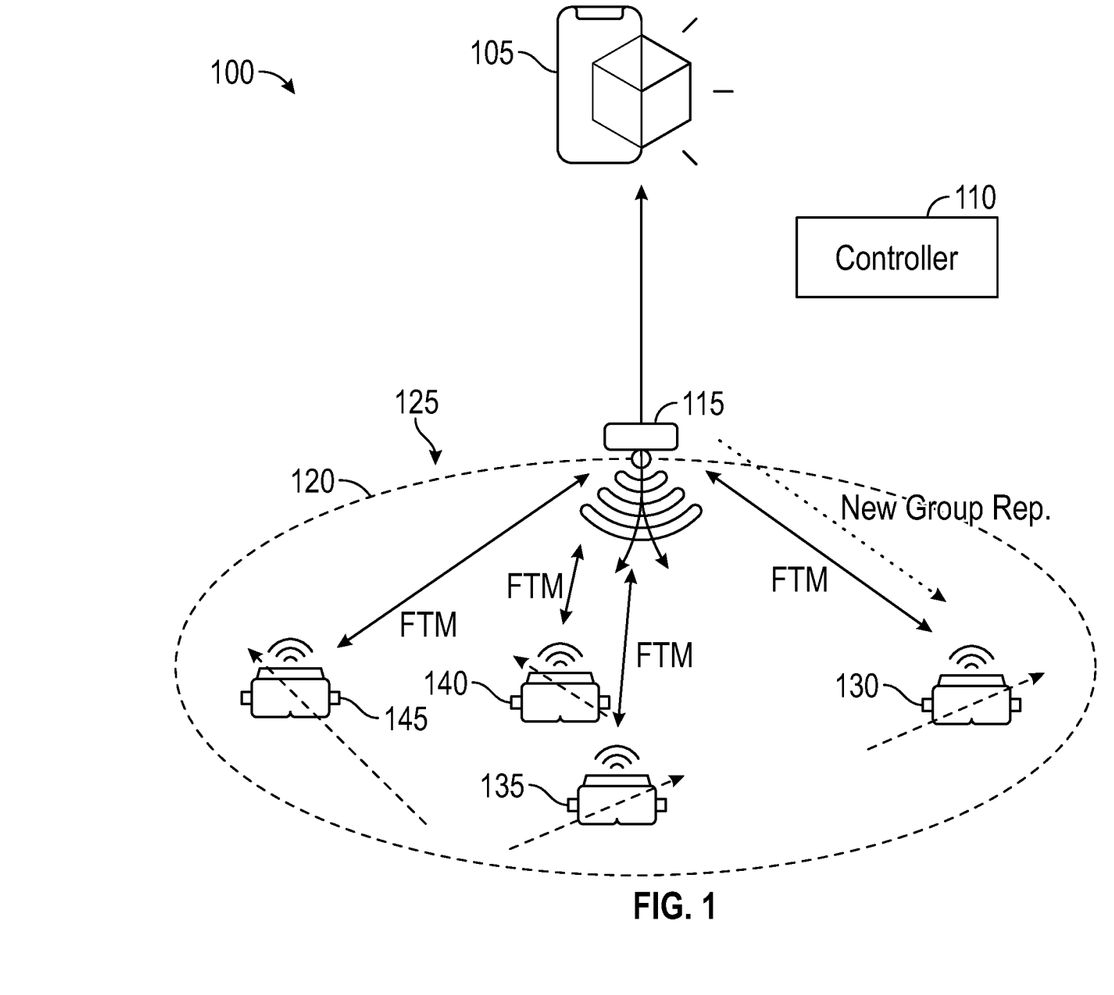
FIG. 1 is a block diagram of an operating environment for providing time synchronization distribution in a network.

FIG. 1 shows a block diagram of an operating environment 100 for providing time synchronization distribution in a network. As shown in FIG. 1, operating environment 100 may comprise a time server 105, a controller 110, an Access Point (AP) 115, a coverage environment 120, and a plurality of client devices 125. Plurality of client devices 125 (i.e., stations) may comprise a first client device 130, a second client device 135, a third client device 140, and a fourth client device 145. Coverage environment 120 may comprise, but is not limited to, a Wireless Local Area Network (WLAN). AP 115 may provide wireless network access (e.g., access to the WLAN) for plurality of client devices 125. AP 115 may be compatible with specification standards such as, but not limited to, the Institute of IEEE 802.11 specification standard for example. Coverage environment 120 may comprise, but is not limited to, an outdoor wireless environment, such as a mesh (e.g., a Wi-Fi mesh). Embodiments of the disclosure may also apply to indoor wireless environments and non-mesh environments.

Ones of plurality of client devices 125 may comprise, but are not limited to, a smart phone, a personal computer, a tablet device, a mobile device, a telephone, a remote control device, a set-top box, a digital video recorder, an Internet-of-Things (IoT) device, a network computer, a router, an Automated Transfer Vehicle (ATV), a drone, an Unmanned Aerial Vehicle (UAV), a Virtual reality (VR)/Augmented reality (AR) device, or other similar microcomputer-based device. In the example shown in FIG. 1, plurality of client devices 125 may comprise VR/AR devices.

Controller 110 may comprise a Wireless Local Area Network controller (WLC) and may provision and control operating environment 100 (e.g., the WLAN). Controller 110 may allow plurality of client devices 125 to join coverage environment 120. In some embodiments of the disclosure, controller 110 may be implemented by a Digital Network Architecture Center (DNAC) controller (i.e., a Software-Defined Network (SDN) controller) that may configure information for operating environment 100 in order to provide time synchronization distribution in a network.

The elements described above of operating environment 100 (e.g., time server 105, controller 110, AP 115, and plurality of client devices 125) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 5, the elements of operating environment 100 may be practiced in a computing device 500.

Any of plurality of client devices 125 may synchronize their clock with AP 115. In order to accomplish this synchronization, TM exchanges, FTM exchanges, or Trigger Based (TB) ranging may be used. For example, using the IEEE 802.11 AS standard with FTM protocol, an IEEE 802.11 AS process on first client device 130, for example, may initiate a Medium Access Control (MAC) Sublayer Management Entity (MLME)-FINETIMNINGMSMT.request to its Wi-Fi interface in order to synchronize first client device 130's clock with AP 115's. This may be accomplished by computing the FTM propagation delay from standard exchange of FTM measurement frames with associated timestamps (e.g., $t_1$, $t_4$) and the IEEE 802.1AS followUpInformation Information Elements (IEs) (i.e., preciseOriginTimeStamp and a correctionField (initially unset)). This is done in order to represent the offset between time server 105's master time-stamp and the actual time at which the IEEE 802.11 AS values are transmitted by AP 115's Wi-Fi interface to first client device 130. The FTM process may allow first client device 130 to compute its actual local system time T as preciseOriginTimeStamp+correctionField+FTM_delay $(((t_4-t_1)-(t_3-t_2))/2)$.

Figure 2:
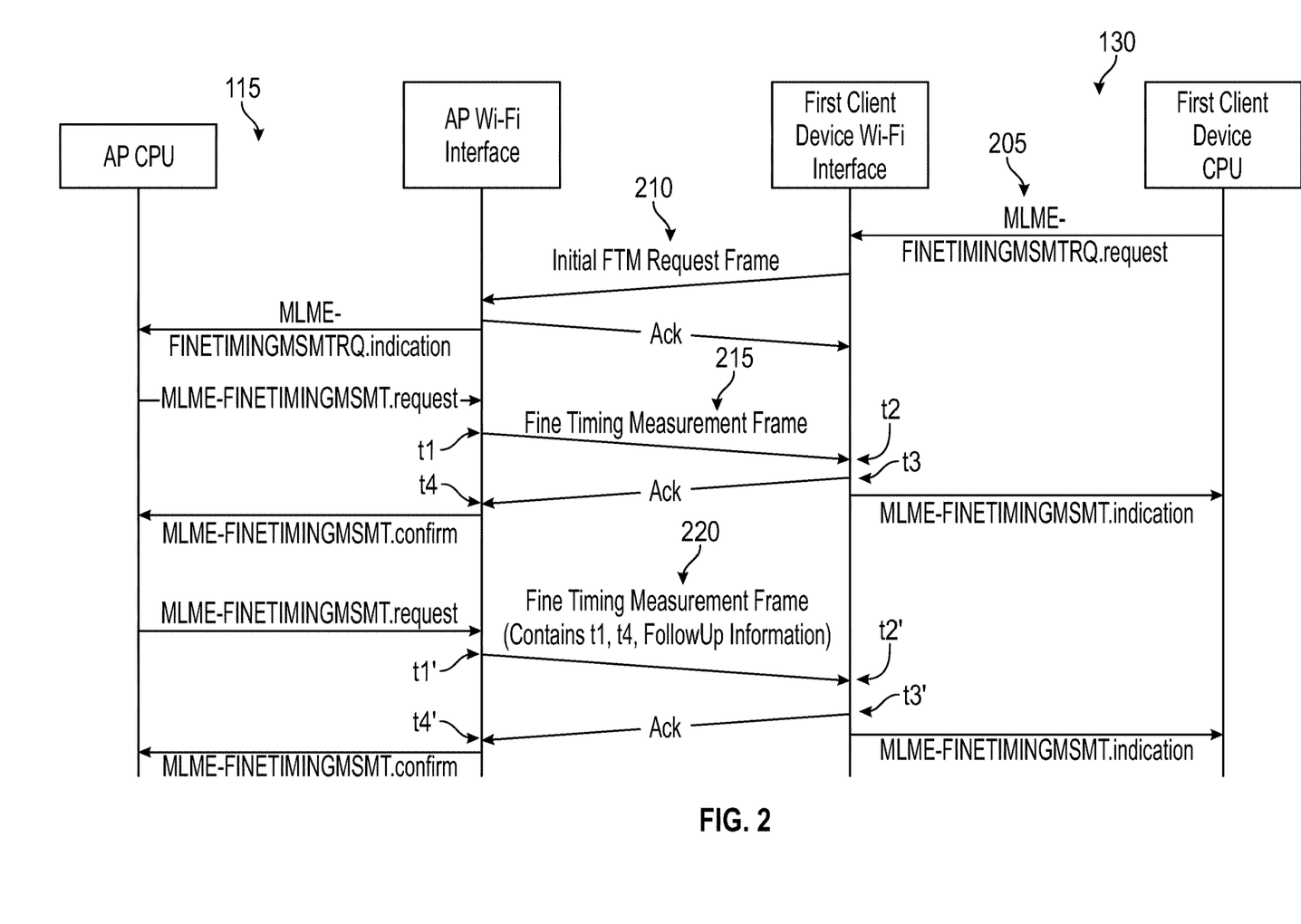
FIG. 2 is a flow chart of a method for providing time synchronization distribution in a network.

FIG. 2 illustrates the FTM process between AP 115 and first client device 130. While first client device 130 is shown in FIG. 2, the FTM process may be performed with any of plurality of client devices 125. As shown in FIG. 2, first client device 130 may need to synchronize its clock. Accordingly, first client device 130 may initiate an IEEE 802.11 AS process that may initiate a MLME-FINETIMINGMSMT.request to first client device 130's Wi-Fi interface (stage 205). The IEEE 802.11 field that the MLME may process may be internal to a given system and may not be sent over the air to another entity. AP 115 may have synchronized its clock with an external source (e.g., time server 105), and thus AP 115's Central Processing Unit (CPU) may be the master (with system time), and AP 115's Wi-Fi interface may be the MLME attached to the master with a running Timing Synchronization Function (TSF) clock. First client device 130's host CPU may be the slave (with its own system time) and client device 135's Wi-Fi interface may be the MLME attached to the slave with a running TSF clock. In the process illustrated by FIG. 4, an initial FTM request frame may be sent and acknowledged (stage 210). Then a first FTM measurement frame may be exchanged (stage 215). Next, a second FTM measurement frame may be exchanged to provide t1, t4, and follow up information (e.g., preciseOriginTimeStamp and a correctionField) (stage 220).

Figure 3:
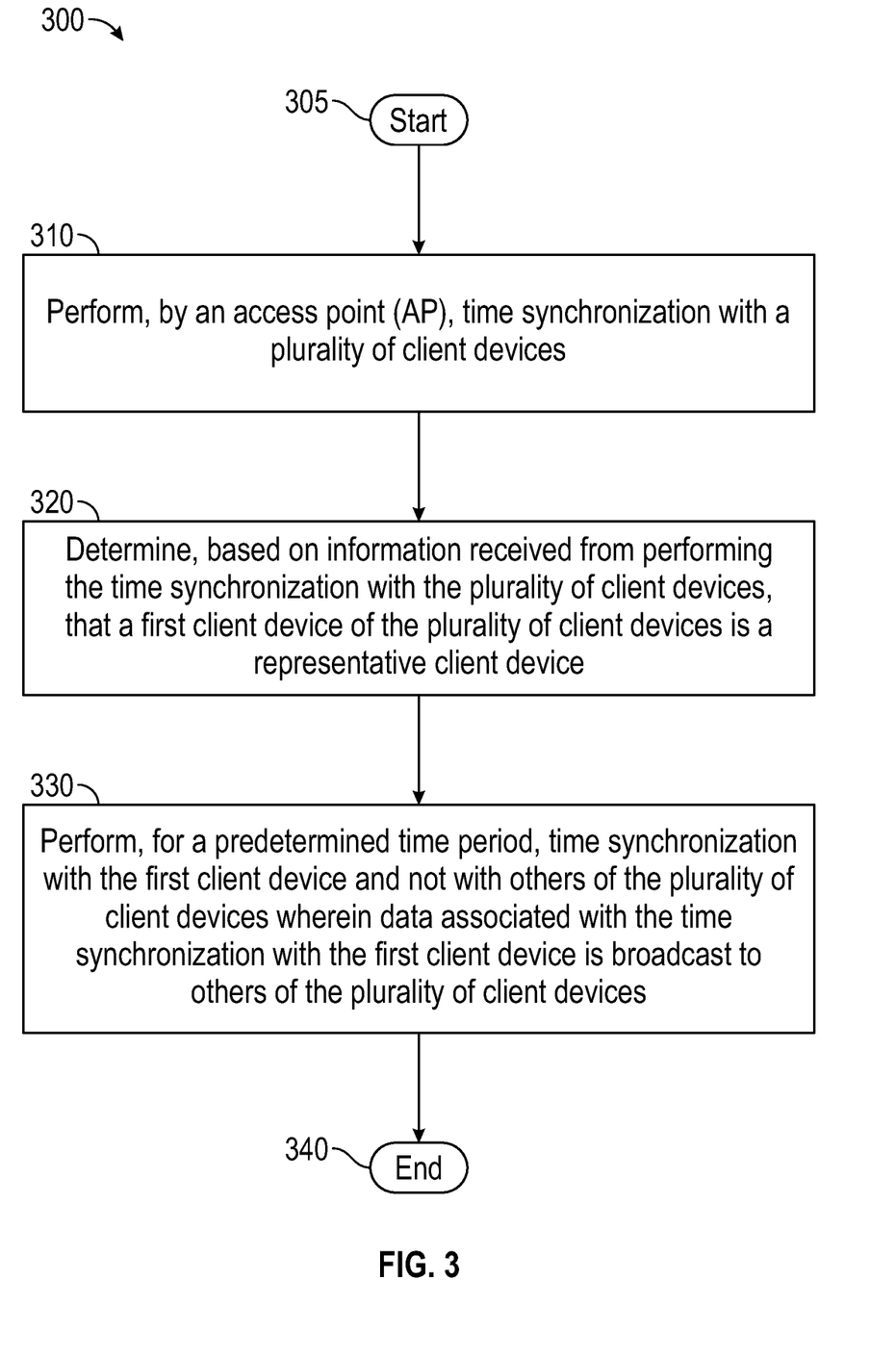
FIG. 3 illustrates a Fine Timing Measurement (FTM) process.

FIG. 3 is a flow chart setting forth the general stages involved in a method 300 consistent with an embodiment of the disclosure for providing time synchronization distribution in a network. Method 300 may be implemented using an AP 115 as described in more detail above with respect to FIG. 1. Ways to implement the stages of method 300 will be described in greater detail below.

Method 300 may begin at starting block 305 and proceed to stage 310 where AP 115 may perform time synchronization with plurality of client devices 125. For example, to solve the aforementioned transaction overhead issue, it may be recognized that the process of synchronizing each client device may be to compensate for two delay elements: i) host master-clock to Over-the-Air (OTA) processing delay; and ii) OTA propagation delay. However, in practice the former (e.g., in ms) may dominate and the latter (e.g., in ns) may be treated as a bounded error (e.g., based on size of WiFi cell). Doing so may allow a broadcast form of gPTP.

Embodiments of the disclosure may provide a hybrid broadcast mode adapted to IEEE 802.11. As per IEEE 802.11 AS, embodiments of the disclosure may compute: i) Precision Time Protocol (PTP) instance (e.g., AP 115) to ingress Coordinated Shared Networks (CSN) node (i.e., AP processing delay to transmitter); and ii) egress CSN node (client device) to PTP instance (client device host processing delay). In a first exchange, each client device may also compute its Time-of-Flight (ToF) to and from AP 115, labeled in IEEE 802.1 AS ingress to egress CSN node delay.

With embodiments of the disclosure, each client device mentions in its next TM request the previous exchange ToF. In another embodiment, the client device may report its Load Management Report (LMR) feedback with an equivalent effect (i.e., AP 115 may know each client device's current ToF distance to AP 115).

From stage 310, where AP 115 performs time synchronization with plurality of client devices 125, method 300 may advance to stage 320 where AP 115 may determine, based on information received from performing the time synchronization with plurality of client devices 125, that first client device 130 of plurality of client devices 125 is a representative client device. For example, AP 115 may select a client device in plurality of client devices 125 with a longest ToF as a group representative for the next exchange. The client device in plurality of client devices 125 with the longest ToF may be considered farthest of the plurality of client devices 125 away from the AP 115. In another embodiment, with Trigger Based (TB) ranging, AP 115 may select a group of m client devices (e.g., 4) with the largest ToF values as group representatives. At the conclusion of the second exchange, AP 115 may send to each client device, in addition to the FollowUp Information (time sync) element, a flag representative (e.g., yes it is a representative or no it is not a representative), along with the values (e.g., cycle count, target MAC address).

Once AP 115 determines, based on information received from performing the time synchronization with plurality of client devices 125, that first client device 130 of plurality of client devices 125 is the representative client device in stage 320, method 300 may continue to stage 330 where AP 115 may perform, for a predetermined time period, time synchronization with first client device 130 and not with others of the plurality of client devices 125. Data associated with the time synchronization with first client device 130 may be broadcast to others of plurality of client devices 125. For example, for the next n cycles, the representative client device may be the only client device initiating the TM/FTM exchange. AP 115 may send the TM/FTM frame to the target multicast/broadcast address. All client devices in the group (i.e., plurality of client devices 125) may receive the frame and parse the FollowUp Information element to extract the time information. They may use the ToF value computed from the first 2 exchanges to add the ToF value. The representative client device may acknowledge the frame.

Figure 4:
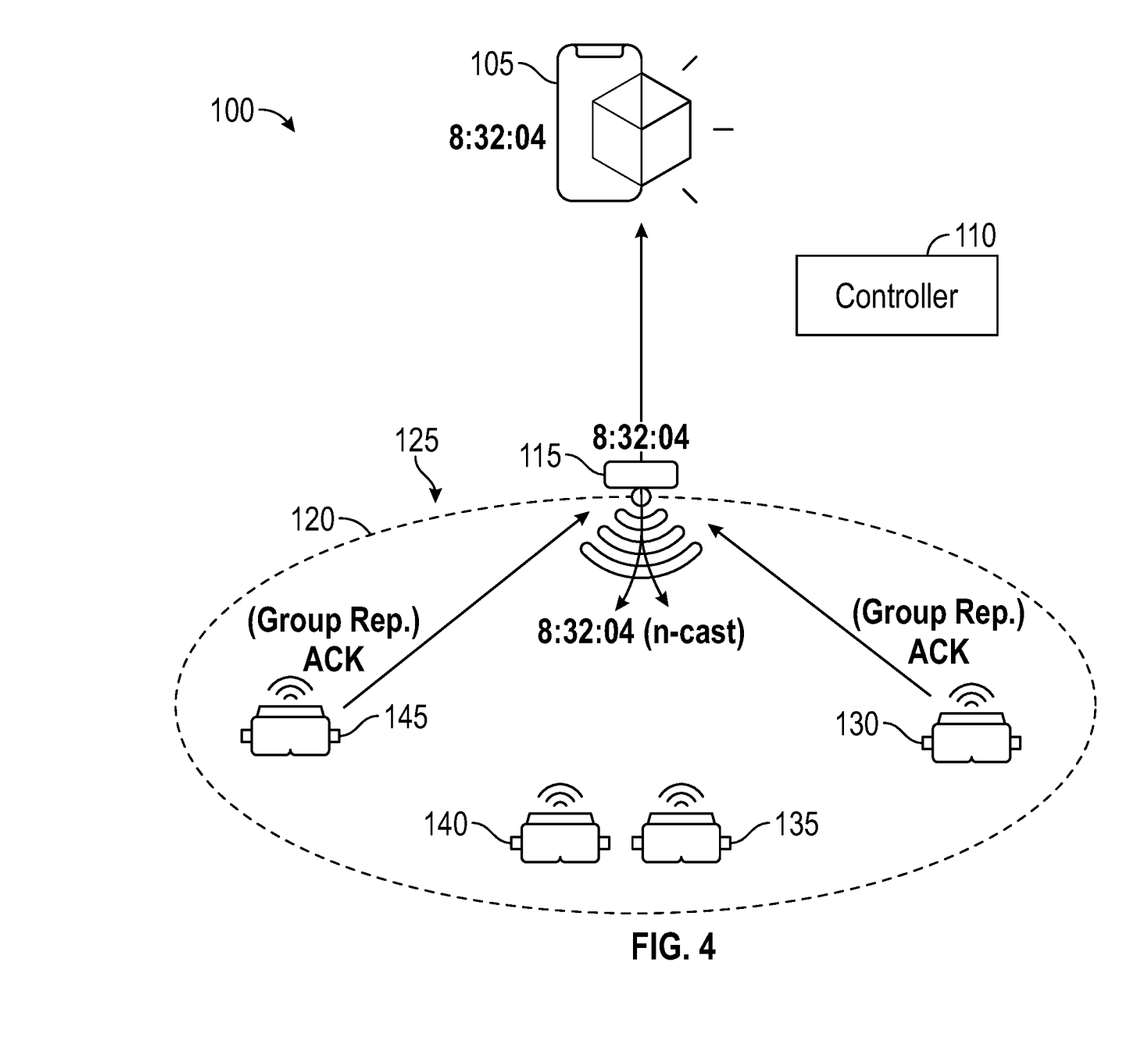
FIG. 4 is a block diagram of an operating environment for providing time synchronization distribution in a network.

As illustrated by FIG. 4, in a TB Up Link (UL) Orthogonal Frequency Division Multiplexing Access (OFDMA) mode, AP 115 may trigger the m representatives with a broadcast FTM trigger type. These client devices may then send the IFTMR frame as the UL OFDMA Multi-User Physical Layer Protocol Data Unit (MU-PPDU) data. AP 115 may send the FTM frame to a target group address, and all representative client devices may be triggered to acknowledge FTM frame reception as per the TB UL OFDMA mode. Once n cycles (e.g., 10) have completed in the broadcast mode, each client device may re-enter a short series (e.g., 2) of unicast exchanges, so as to actualize its ToF value. Then method 300 may be repeated.

Accordingly, embodiments of the disclosure may provide a process to augment and efficiently distribute IEEE 802.1 AS time synchronization in IEEE 802.11 high client device density environments. With this process, all client devices may synchronize with the same application and time server without consuming excessive airtime. Once AP 115 performs, for the predetermined time period, time synchronization with first client device 130 and not with others of the plurality of client devices 125 in stage 330, method 300 may then end at stage 340.

Figure 5:
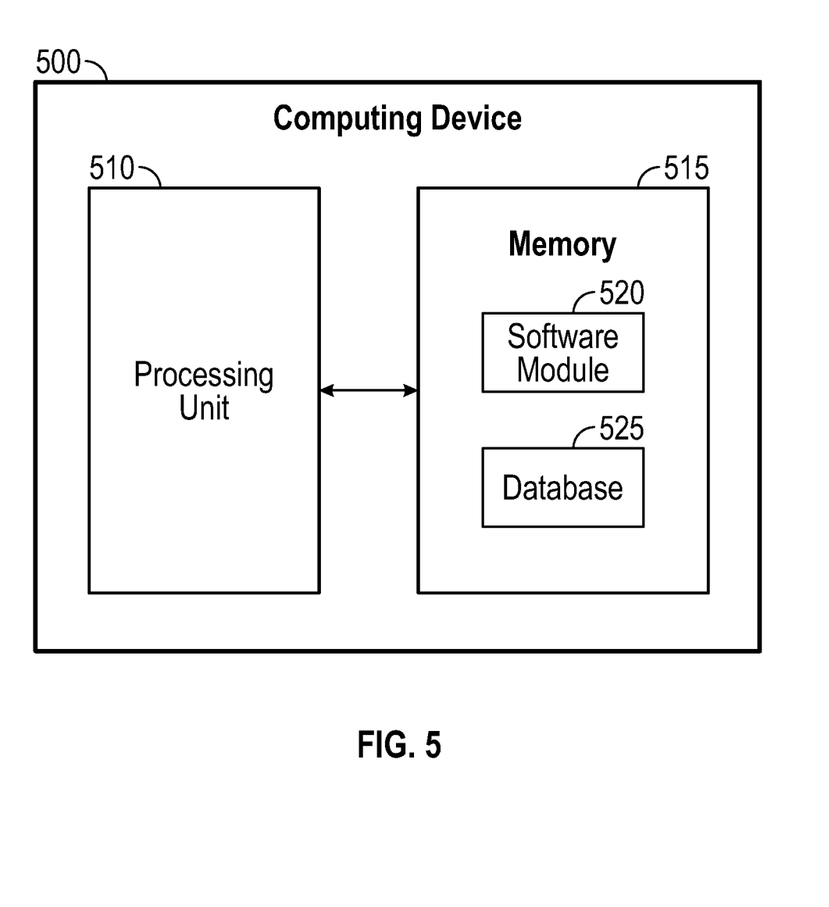
FIG. 5 is a block diagram of a computing device.

FIG. 5 shows a computing device 500. As shown in FIG. 5, computing device 500 may include a processing unit 510 and a memory unit 515. Memory unit 515 may include a software module 520 and a database 525. While executing on processing unit 510, software module 520 may perform, for example, processes for providing time synchronization distribution in a network as described above with respect to FIG. 2. Computing device 500, for example, may provide an operating environment for the elements of FIG. 1. The elements of FIG. 1 may operate in other environments and are not limited to computing device 500.

Computing device 500 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 500 may comprise any computer operating environment, such as hand-held devices, multiprocessor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples and computing device 500 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
    performing, by an Access Point (AP), time synchronization with a plurality of client devices;
    determining, by the AP based on information received from performing the time synchronization with the plurality of client devices, that a first client device of the plurality of client devices is a representative client device of the plurality of client devices;
    performing, by the AP for each cycle of a predetermined number of cycles, from performing time synchronization with the plurality of client devices, the time synchronization only with the first client device that was determined as the representative client device of the plurality of client devices and not with others of the plurality of client devices; and
    broadcasting, by the AP for each cycle until the predetermined number of cycles, data associated with the time synchronization with the first client device to each of the plurality of client devices for which the first client device is the representative client device.

2. The method of claim 1, wherein performing the time synchronization with the plurality of client devices comprises performing Time Management (TM) exchanges.

3. The method of claim 1, wherein performing the time synchronization with the plurality of client devices comprises performing Fine Time Management (FTM) exchanges.

4. The method of claim 1, wherein performing the time synchronization with the plurality of client devices comprises using Trigger Based (TB) ranging.

5. The method of claim 1, wherein determining that the first client device of the plurality of client devices is the representative client device comprises determining the first client device is farthest of the plurality of client devices away from the AP.

6. The method of claim 1, further comprising, after the predetermined time period, performing time synchronization with the plurality of client devices.

7. The method of claim 1, wherein the others of the plurality of client devices synchronize their clocks using the data associated with the time synchronization with the first client device that was broadcast to the others of the plurality of client devices.

8. A system comprising:
    a memory storage; and
    a processing unit disposed in an Access Point (AP), the processing unit coupled to the memory storage, wherein the processing unit is operative to:
        perform time synchronization with a plurality of client devices;
        determine, based on information received from performing the time synchronization with the plurality of client devices, that a first client device of the plurality of client devices is a representative client device of the plurality of client devices; and
        perform, for a predetermined time period, time synchronization with the first client device that was determined as the representative client device of the plurality of client devices and not with others of the plurality of client devices; and
        broadcast, for each cycle until the predetermined number of cycles, data associated with the time synchronization with the first client device to others of the plurality of client devices for which the first client device is the representative client device.

9. The system of claim 8, wherein the processing unit being operative to perform the time synchronization with the plurality of client devices comprises the processing unit being operative to perform Time Management (TM) exchanges.

10. The system of claim 8, wherein the processing unit being operative to perform the time synchronization with the plurality of client devices comprises the processing unit being operative to perform Fine Time Management (FTM) exchanges.

11. The system of claim 8, wherein the processing unit being operative to perform the time synchronization with the plurality of client devices comprises the processing unit being operative to use Trigger Based (TB) ranging.

12. The system of claim 8, wherein the processing unit being operative to determine that the first client device of the plurality of client devices is the representative client device comprises the processing unit being operative to determine the first client device is farthest of the plurality of client devices away from the AP.

13. The system of claim 8, further comprising, after the predetermined time period, the processing unit being operative to perform time synchronization with the plurality of client devices.

14. A non-transitory computer-readable medium that stores a set of instructions which when executed perform a method executed by the set of instructions comprising:
- performing, by an Access Point (AP), time synchronization with a plurality of client devices;
- determining, by the AP based on information received from performing the time synchronization with the plurality of client devices, that a first client device of the plurality of client devices is a representative client device;
- performing, by the AP for a predetermined time period, time synchronization with the first client device that was determined as the representative client device of the plurality of client devices and not with others of the plurality of client devices; and
- broadcasting, by the AP for each cycle until the predetermined number of cycles, data associated with the time synchronization with the first client device is broadcast to others of the plurality of client devices for which the first client device is the representative client device.

15. The non-transitory computer-readable medium of claim 14, wherein performing the time synchronization with the plurality of client devices comprises performing Time Management (TM) exchanges.

16. The non-transitory computer-readable medium of claim 14, wherein performing the time synchronization with the plurality of client devices comprises performing Fine Time Management (FTM) exchanges.

17. The non-transitory computer-readable medium of claim 14, wherein performing the time synchronization with the plurality of client devices comprises using Trigger Based (TB) ranging.

18. The non-transitory computer-readable medium of claim 14, wherein determining that the first client device of the plurality of client devices is the representative client device comprises determining the first client device is farthest of the plurality of client devices away from the AP.

19. The non-transitory computer-readable medium of claim 14, further comprising, after the predetermined time period, performing time synchronization with the plurality of client devices.

20. The non-transitory computer-readable medium of claim 14, wherein the others of the plurality of client devices synchronize their clocks using the data associated with the time synchronization with the first client device that was broadcast to the others of the plurality of client devices.

\* \* \* \* \*